(12) United States Patent
Sharma et al.

(10) Patent No.: US 8,083,901 B2
(45) Date of Patent: Dec. 27, 2011

(54) DE-ENTRAINMENT TRAY FOR HIGH CAPACITY OPERATION

(75) Inventors: Arun K. Sharma, Missouri City, TX (US); Theodore Sideropoulos, Oakton, VA (US); Berne K. Stober, Chonburi (TH); Brian D. Albert, Fairfax, VA (US); Alvin U. Chen, Fairfax, VA (US); Vikram Singh, Naperville, IL (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 937 days.

(21) Appl. No.: 12/071,218

(22) Filed: Feb. 19, 2008

(65) Prior Publication Data

US 2008/0202914 A1   Aug. 28, 2008

Related U.S. Application Data

(60) Provisional application No. 60/902,863, filed on Feb. 23, 2007.

(51) Int. Cl.
*B01D 3/06* (2006.01)
*B01D 3/20* (2006.01)

(52) U.S. Cl. ............ 202/158; 55/462; 96/189; 202/197; 203/40; 203/88; 261/114.1

(58) Field of Classification Search ............. 202/158, 202/197; 203/40, 88; 55/462; 96/189; 261/114.1
See application file for complete search history.

(56) References Cited

U.S. PATENT DOCUMENTS

| 335,281 A | 2/1886 | Goldwater |
| 1,918,005 A | 7/1933 | Urquhart |
| 2,055,048 A | 9/1936 | Puls |
| 2,523,529 A | 9/1950 | Zwicki |
| 2,932,363 A * | 4/1960 | Moyer ............................ 55/346 |
| 2,986,233 A | 5/1961 | Yap et al. |
| 3,501,400 A * | 3/1970 | Brody ............................ 208/361 |
| 3,859,063 A * | 1/1975 | Porter et al. .................... 96/297 |
| 4,270,975 A * | 6/1981 | Bennett ........................ 159/27.2 |
| 4,698,138 A | 10/1987 | Silvey |
| 4,721,603 A * | 1/1988 | Krug et al. .................... 422/147 |

(Continued)

FOREIGN PATENT DOCUMENTS

GB      3741      0/1912

(Continued)

OTHER PUBLICATIONS

International Search Report, PCT/US2008/002066, mailed Apr. 6, 2009.

(Continued)

*Primary Examiner* — Virginia Manoharan
(74) *Attorney, Agent, or Firm* — Glenn T. Barrett; Malcolm D. Keen (57) ABSTRACT

A de-entrainment device separates entrained liquid from vapor in a fluid stream that flows through a chimney tray in a distillation tower. The separated liquid is collected and shielded from the fluid stream to prevent re-entrainment of the liquid in the vapor flowing upward into the tower. The chimney tray includes risers with hats that have gutters to guide liquid toward the tray deck, channels to collect and drain liquid from the top of the hats to the tray deck, and baffles extending from the risers to shield the liquid collected on the tray deck from the vapor flow.

9 Claims, 9 Drawing Sheets

U.S. PATENT DOCUMENTS

| | | | |
|---|---|---|---|
| 4,744,929 A | | 5/1988 | Robinson et al. |
| 4,933,047 A | | 6/1990 | Bannon |
| 5,034,103 A | * | 7/1991 | Hamer et al. .................. 202/158 |
| 5,219,532 A | * | 6/1993 | Buttke et al. ................... 422/140 |
| 5,837,105 A | * | 11/1998 | Stober et al. ..................... 203/40 |
| 5,972,171 A | | 10/1999 | Ross et al. |
| 6,682,633 B1 | * | 1/2004 | Xu et al. ............................ 203/1 |
| 7,896,937 B2 | * | 3/2011 | Miemiec ......................... 55/337 |
| 2002/0079597 A1 | | 6/2002 | Bartlok |
| 2003/0188851 A1 | * | 10/2003 | Laird et al. ..................... 165/132 |
| 2004/0099969 A1 | | 5/2004 | Larson et al. |
| 2004/0107682 A1 | * | 6/2004 | Letzel .............................. 55/444 |
| 2004/0130041 A1 | * | 7/2004 | Resetarits et al. ............ 261/79.2 |
| 2007/0145611 A1 | * | 6/2007 | Lee et al. .................... 261/112.2 |
| 2008/0053869 A1 | * | 3/2008 | McCoy et al. .................. 208/42 |

FOREIGN PATENT DOCUMENTS

WO      WO 2005/102502 A1      11/2005

OTHER PUBLICATIONS

Written Opinion, PCT/US2008/002066, mailed Apr. 6, 2009.

* cited by examiner

DE-ENTRAINMENT TRAY FOR HIGH CAPACITY OPERATION

CROSS REFERENCE TO RELATED APPLICATIONS

This application relates to and claims priority to U.S. Provisional Patent Application No. 60/902,863, entitled "Improved De-Entrainment Tray for High Capacity Operation," filed on Feb. 23, 2007.

BACKGROUND OF THE INVENTION

1. Field of the Invention

This invention relates to devices for separating entrained liquid from vapor. In particular, this invention relates to de-entrainment trays used in distillation towers, especially with respect to hydrocarbon processing.

2. Discussion of Related Art

Separation units, such as atmospheric distillation units, vacuum distillation units and product strippers, are major processing units in a refinery. Atmospheric or vacuum distillation units separate crude oil into fractions according to boiling point so downstream processing units, such as hydrogen treating or reforming units, will have feedstocks that meet particular specifications. Crude oil separation is accomplished by fractionating the total crude oil at essentially atmospheric pressure and then feeding a bottoms stream of high boiling hydrocarbons, also known as topped crude, from the atmospheric distillation unit to a second distillation unit operating at a vacuum pressure.

The vacuum distillation unit typically separates the atmospheric unit bottoms into gas oil vapors based on boiling point, including light gas oil, heavy gas oil, vacuum gas oil, and vacuum reduced crude. The vacuum reduced crude is also known as residuum or "resid" and leaves the vacuum distillation unit as a liquid bottoms stream.

In atmospheric or vacuum distillation, lighter hydrocarbons are vaporized and separated from relatively heavier hydrocarbons so that they can be fed downstream for catalytic processing. Although the heavier hydrocarbons do not vaporize, they may be carried into the lighter hydrocarbons due to entrainment. The entrained heavier hydrocarbons are typically contaminated with metals, such as vanadium or nickel, which can poison the downstream catalytic processing, such as hydrotreating, hydrocracking, or fluid catalytic cracking.

In vacuum distillation, bottoms separated from crude oil by an atmospheric distillation unit are fed to a flash zone in the lower portion of the vacuum distillation unit. Various methods of reducing entrainment of residuum from the flash zone have been developed. One conventional assembly uses a bubble-cap tray above the flash zone to cause the vapor to pass through liquid on the bubble-cap tray, thereby allowing vapor to re-entrain liquid droplets. These re-entrained droplets may contain less of the higher boiling components, but their presence in the vapor stream can adversely impact fractionation and downstream processing. In addition, the bubble-cap tray exhibits a pressure drop and thus increases the flash zone pressure required to drive the vapor through the bubble-cap tray, which necessitates a higher flash zone temperature and prevents a deeper cut distillation.

Standard chimney trays have also been used that include a plurality of risers attached to a plate having holes and a hat attached to the top of each riser. Some chimney trays provide two 90 degree direction changes, with the first direction change occurring when a stream from the riser contacts the hat and the second direction change occurring when the stream exits the chimney. An example of a de-entrainment chimney is disclosed in U.S. Pat. No. 4,698,138, the contents of which are incorporated herein by reference. These types of standard chimneys have a lower pressure drop than bubble-caps, but can still allow significant entrainment.

Another example of a de-entrainment tray is disclosed in U.S. Pat. No. 5,972,171, the contents of which are incorporated herein by reference. In this tray assembly, the risers include devices that impart rotational movement to the fluid stream and use a liquid downcomer to transport the de-entrained liquid from the tray back into the flash zone.

Performance of known de-entrainment trays is poor at higher vapor loads, especially at loads having C-factors of 0.35 ft/s (feet per second or fps) or more. The C-factor is a scaling parameter commonly used in distillation that represents the vapor flow that corrects superficial velocity with density. One problem in conventional devices is that separated liquid can become re-entrained. For example, liquid dripping down the inside or outside of a chimney type tray can become re-entrained by the upflowing vapor at high C-factors, which is a measure of vapor load. Also, liquid deposited on the deck of the tray can get re-entrained by the feed vapor at high C loads.

There is a need for a separation device that exhibits improved performance at high vapor loads. It would be beneficial to provide a system in which re-entrainment is avoided at high vapor loads.

BRIEF SUMMARY OF THE INVENTION

Aspects of embodiments of the invention relate to providing a separation device for a fluid stream with vapor and liquid entrained therein that effectively separates the entrained liquid and prevents the separated liquid from being re-entrained in the fluid stream.

Another aspect of embodiments of the invention relates providing a de-entrainment device that is effective at high vapor loads.

This invention is directed to a de-entrainment device for separating an entrained liquid from a vapor stream comprising a de-entrainment tray including a tray deck, a plurality of risers extending upwardly through the deck, wherein each riser has a perimeter wall defining a central hollow passage and an outlet, and a plurality of hats. Each hat has a top with an upper surface and a lower surface and a peripheral wall extending downwardly from the top. Each hat is disposed over one riser with the lower surface of the top spaced above its outlet and the peripheral wall surrounding and spaced from the perimeter wall of the riser. An S-shaped vapor flow path extends from below the tray deck, through the passage in the risers, and under the peripheral wall of the hats. Means for preventing re-entrainment of liquid separated from a vapor stream in the vapor flow path is provided.

The means for preventing re-entrainment may include a baffle extending outwardly from the perimeter wall of each riser to a point beyond the peripheral wall of the associated hat.

The means for preventing re-entrainment may also include a channel formed on the upper surface of the top of each hat, wherein each channel has a drain so that liquid collected on the upper surface of the top of the hat flows downward to the tray deck. The drain may be a downcomer extending from the top of the hat toward the tray deck. The drain could also be a spillway.

The means for preventing re-entrainment may also include a gutter disposed on an interior side of the peripheral wall to collect liquid separated from the vapor flow path accumulated on the peripheral wall.

Each of the above means may be used alone or in any combination.

The device may be combined with a distillation tower, wherein the de-entrainment tray is positioned within the distillation tower. The device may also be used in combination with a refinery operation.

The invention also relates to a distillation tower comprising a tower shell, including a flash zone and a wash zone, wherein a vapor flow path is defined through the flash zone and upwardly to the wash zone. A de-entrainment tray is disposed in the tower shell downstream of the flash zone, wherein the tray includes a tray deck with a plurality of risers and hats disposed on each riser, and wherein a vapor stream is directed in the vapor flow path entering each riser and exiting each hat and liquid is separated from the vapor while flowing through the risers and the hats. The tray includes liquid collecting elements associated with each riser and hat that shields the liquid separated from the vapor stream from the vapor flow path.

Each hat may have an upper surface and the liquid collecting elements may be channels and drains formed in the upper surfaces of the hats. Each riser may have a perimeter wall defining a central hollow passage, and the liquid collecting elements may be baffles extending outwardly from the perimeter walls spaced above the tray deck. Each hat may have a peripheral wall that surrounds the associated riser, and the liquid collecting elements may be gutters formed on an inner surface of the peripheral wall. The liquid collecting elements may be used alone or in combination.

The invention also relates to a method of de-entraining liquid from a fluid stream comprising a vapor and entrained liquid flowing from a flash zone in a distillation tower comprising directing the fluid stream through de-entrainment tray positioned above the flash zone, separating the liquid from the vapor in the fluid stream so that the liquid flows to the tray deck and the vapor flows upward in the tower from the hats, and collecting the separated liquid and shielding it from the fluid stream to prevent re-entrainment of the liquid in the vapor flow. The de-entrainment tray has a tray deck with a plurality of risers covered with hats through which the fluid stream flows making an S-turn.

Collecting the separated liquid and shielding it from the fluid stream may include impeding the fluid stream from being directed onto the tray deck. Impeding the fluid stream may include providing a baffle on the riser above the tray deck to form a barrier to the fluid stream and a cover to liquid collected on the tray deck.

Collecting the separated liquid and shielding it from the fluid stream may also include collecting the liquid in gutters disposed inside the hat and directing the liquid collected in the gutters toward the tray deck and away from the fluid stream.

Collecting the separated liquid and shielding it from the fluid stream may additionally include collecting the liquid from a wash zone in the tower on a top of the hats and directing the collected liquid toward the tray deck and away from the fluid stream. A drain may be provided in the top of the hats for draining the collected liquid. A downcomer may be provided for directing the collected liquid from the top of the hat through the drain to the tray deck. The drain may also be formed as a spillway.

The methods of collection may be used independently or in any combination.

These and other aspects of the invention will become apparent when taken in conjunction with the detailed description and appended drawings.

BRIEF DESCRIPTION OF THE DRAWINGS

The invention will now be described in conjunction with the accompanying drawings in which.

In the drawings, like reference numerals indicate corresponding parts in the different figures.

DETAILED DESCRIPTION OF PREFERRED EMBODIMENTS

The de-entrainment device disclosed herein can be used in various systems that relate to separation devices, particularly devices for separating vapor streams that have entrained liquid droplets. While the device is described in the context of a processing unit in a refinery, especially with respect to crude oil processing, liquid entrainment reduces separation efficiency in other hydrocarbon and non-hydrocarbon systems in which feed entries are flashed. Typical systems include produce strippers or towers that are fed a partially vaporized stream. It will be understood that this device can be used in various settings.

The de-entrainment device of this application can be embodied as a de-entrainment tray disposed in a separation column, or distillation tower, having a flash zone such that the de-entrainment tray is positioned downstream from and in fluid communication with the flash zone. The separation column, such as a distillation or fractionation tower, can be a vacuum, an atmospheric, or a high pressure column. The de-entrainment device functions to separate and remove suspended liquid, typically present as droplets, from a fluid stream of vapor and liquid as the stream flows upwardly from the flash zone in the tower. Separation of the liquid from the vapor is effected by the force of the stream impinging on the walls of the de-entrainment device causing the liquid to collect and flow downwardly to the tray while the vapor flows out of the device upstream in the tower.

Figure 6:
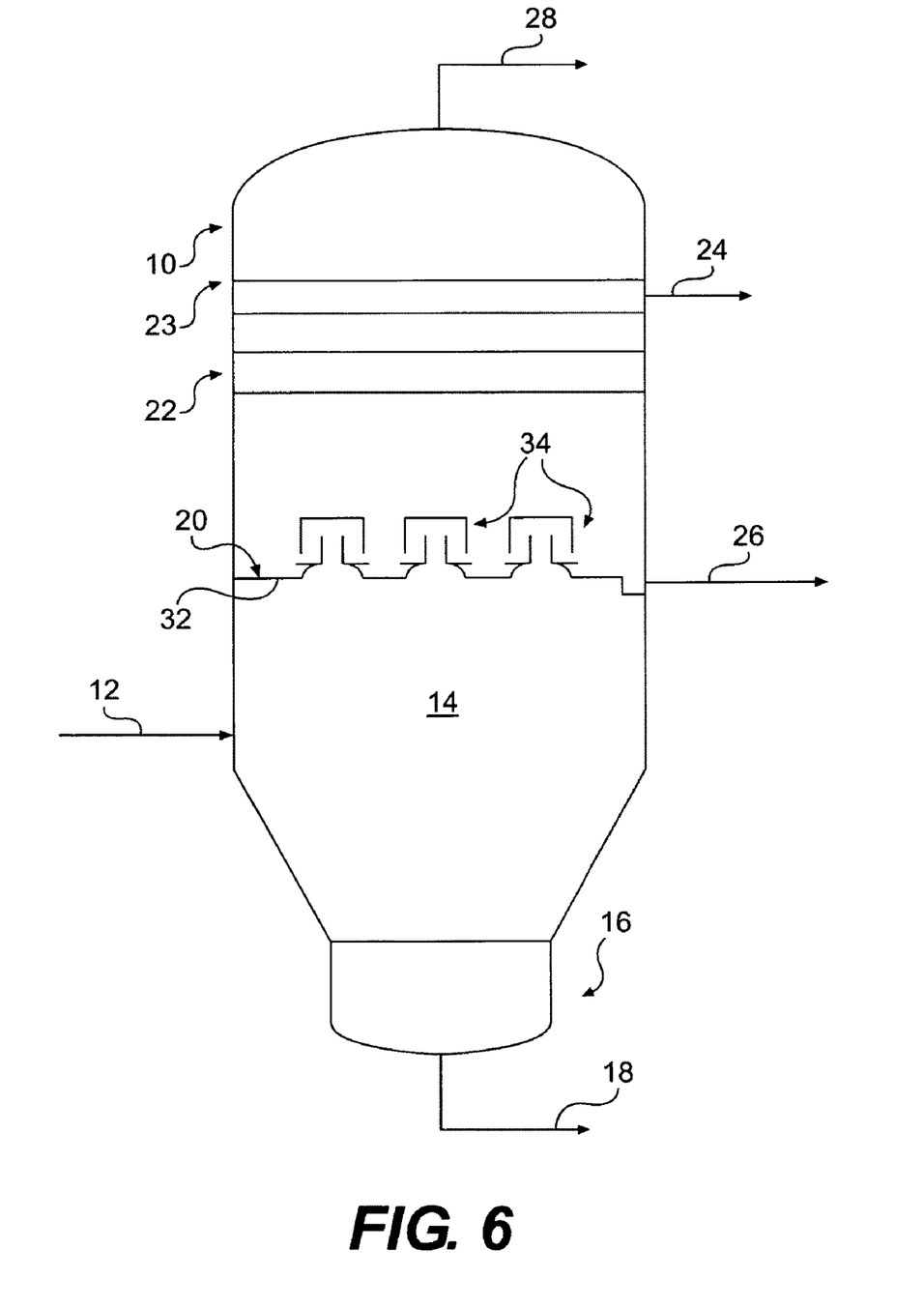
FIG. 6 is a schematic side view in section of a distillation tower for use with the de-entrainment tray assembly.

Referring to FIG. 6, the basic configuration of a distillation tower 10 is shown. In this case as it relates to petrochemical or petroleum processing, a liquid hydrocarbon feed passes through line 12 into the lower portion of the tower to a flash zone 14. The feed contains various hydrocarbon compounds that have different boiling points and are separated in the tower based on the boiling points. Typically, temperature and pressure conditions are maintained in the flash zone so that the feed "flashes" or immediately volatizes a substantial vapor stream that rises upward from the flash zone 14 into the tower 10. The feed that does not volatize, which includes the heavier, liquid hydrocarbons, collects as liquid in the bottom 16 of the tower 10 and is removed through a bottoms line 18.

The lighter hydrocarbons pass upwardly in a vapor stream that includes entrained liquid due to limited size of the flash zone, the turbulent conditions in the flash zone, and the mass of the uprushing vapor stream. The vapor stream flows through a de-entrainment tray 20, to a wash zone 22, and upward to a pump-around bed 23 or beds. As is known, the separated lighter hydrocarbons are drawn off at various points in the pump-around beds 23, schematically represented by line 24. The overflash from the de-entrainment tray 20 is removed via line 26 for further processing or use as feed. In the tower illustrated herein, a vacuum draw-off 28 is shown. Of course, other types of separation columns could also be used. The details of the other components in the tower 10 are known and do not need further description.

Figure 8:
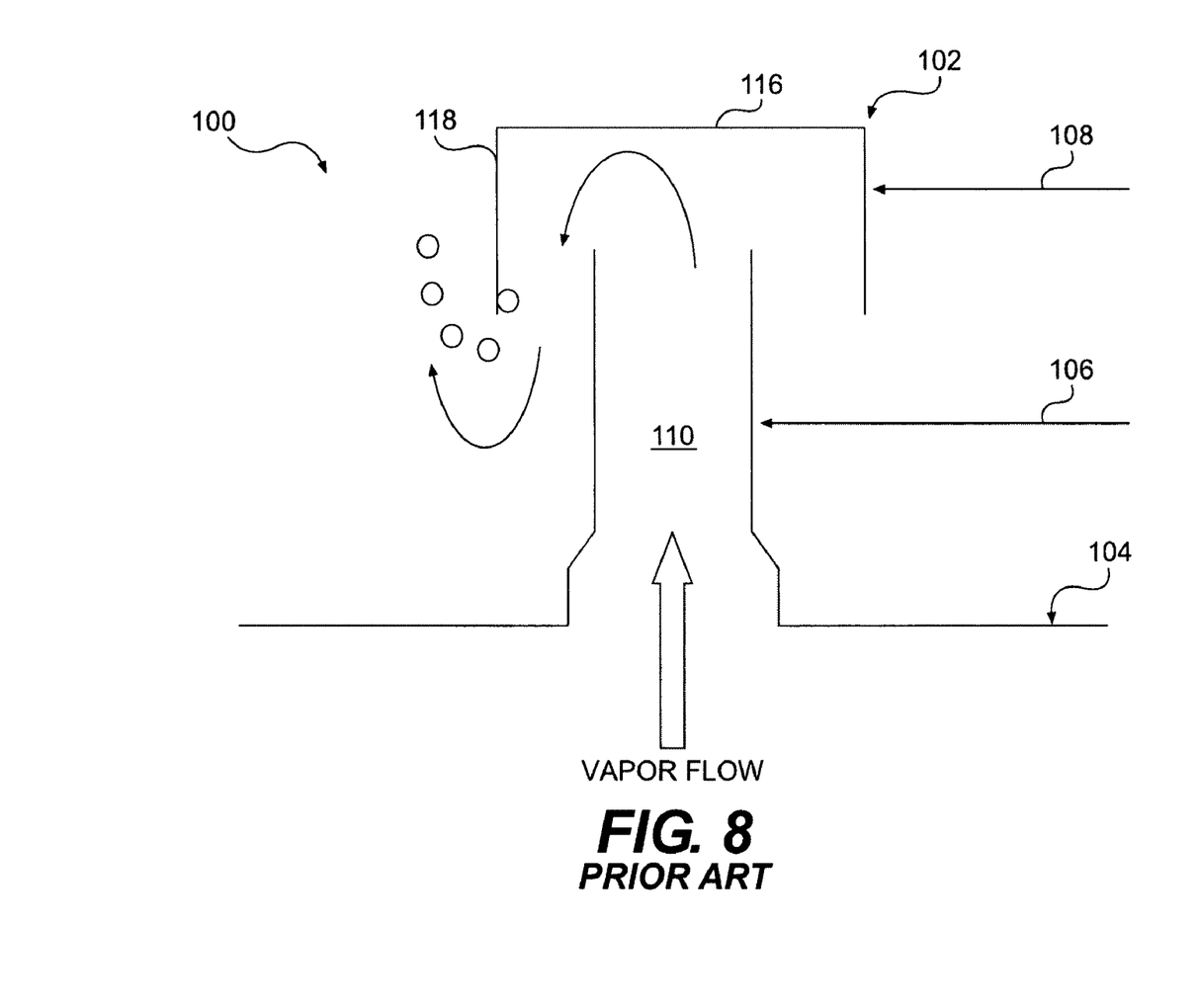

A conventional de-entrainment tray 100 is shown in part in FIG. 8. In use, the tray 100 would include a plurality of chimneys 102 extending from a tray deck 104. Each chimney 102 includes a riser 106 and a hat 108. The riser 106 is formed as a hollow passage 110 defined by a perimeter wall 112 and an outlet 114. The hat 108 is secured to the riser 106 by struts or supports so as to be spaced above the outlet 114. The hat 108 is formed of a top 116 and a peripheral wall 118. A vapor flow path is defined between the perimeter wall 112 and the peripheral wall 118, as represented by the arrows in the figure. As discussed above, the force of the flowing vapor causes liquid entrained therein to separate from the vapor and flow downwardly on the surfaces of the riser 106 and hat 108 toward the tray deck 104. However, when the vapor load is high, as measured by C-factor, the separated liquid droplets tend to be swept up again with the vapor flow, as represented by the droplets in FIG. 8, and become re-entrained with the vapor. This is especially true at loads having a C-factor of 0.35 ft/s or more. Thus, a high amount of resid entrained in the vapor flows to the wash zone, which is undesirable.

FIGS. 1-4 show the details of the de-entrainment device as disclosed herein. The de-entrainment tray 20 includes a tray deck 32 and a plurality of chimneys 34, each formed of a riser 36 and a hat 38. The riser 36 is formed of a perimeter wall 40 defining a hollow interior passage with an outlet 42. The riser 36 extends through the tray deck 32 so that a flow path extends from below the tray deck 32 and into the interior passage, as seen by the arrows in FIGS. 1 and 2. The perimeter wall 40 as seen tapers upwardly. However, it is also possible to use a straight wall. The shape of the perimeter wall 40 is shown as rectangular, but any shape could be provided including circular or oval.

The hat 38 is formed of a top 44 having an upper surface 46 and a lower surface 48. A peripheral wall 50 extends downwardly from the top 44. The hat 38 is mounted on the riser 36 by struts or supports 52, best seen in FIG. 3A. A flow path is defined between the perimeter wall 40 of the riser 36 and the peripheral wall 50 of the hat 38. The lower edge 54 of the peripheral wall 50 extends below the outlet 42 so that the flow path makes an S-shape from within the passage of the riser 36 over the outlet 42 and downwardly under the lower edge 54 of the hat 38 before rising farther upward into the tower 10.

A flow of vapor follows the S-path during which liquid droplets are separated from the vapor due to the different forces experienced by the components in the vapor stream. The two sharp "U-turns" made by the vapor stream in the chimney 34 imparts a strong centrifugal force on the droplets forcing them to travel outwardly. Making the first turn over the outlet 42, liquid droplets are flung to the inside surface of the peripheral wall 50 of the hat 38 where they coalesce. The collected liquid drips down onto the tray deck 32. The droplets that remain entrained after the first U-turn are flung downward to the tray deck 32 for collection. As discussed above, at high vapor loads however, the liquid droplets flowing downward can become entrained in the upward vapor flow. To prevent the re-entrainment of the liquid, liquid collecting elements are provided with each chimney 34 to shield the liquid separated from the vapor stream from the vapor flow path. Three types of collecting elements are disclosed herein. They may be used alone or in any combination.

Figure 2:
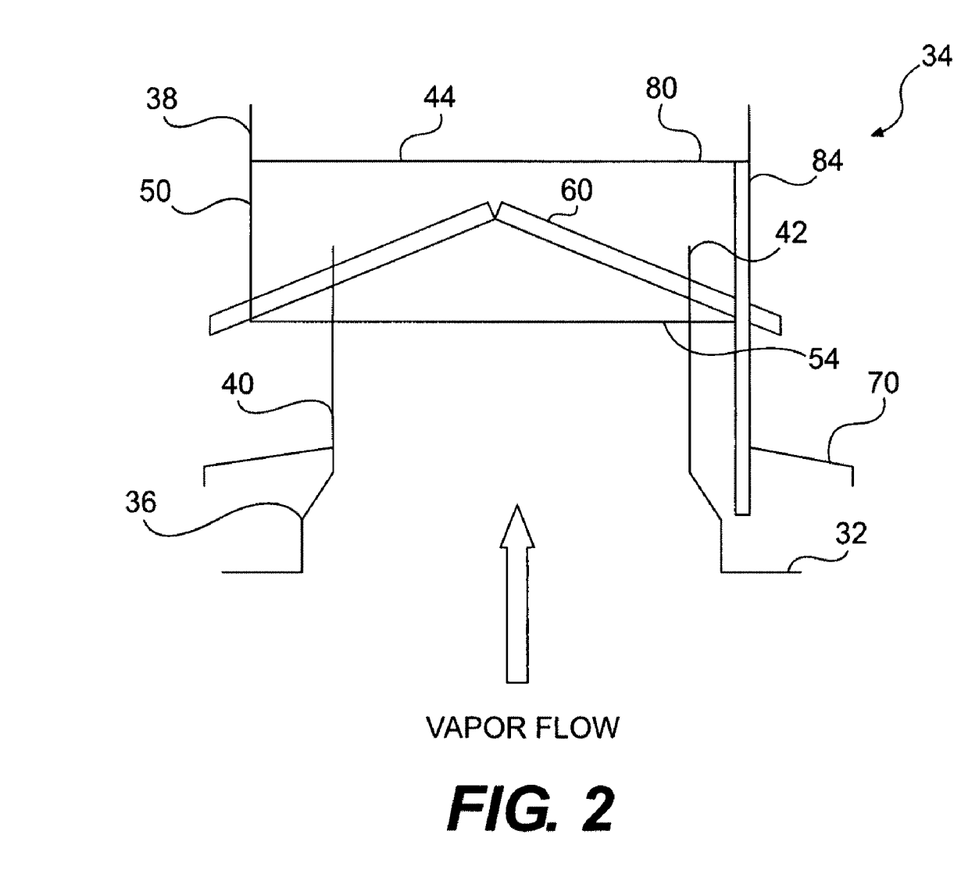
FIG. 2 is a schematic front view of the device of FIG. 1.
Figure 3A:
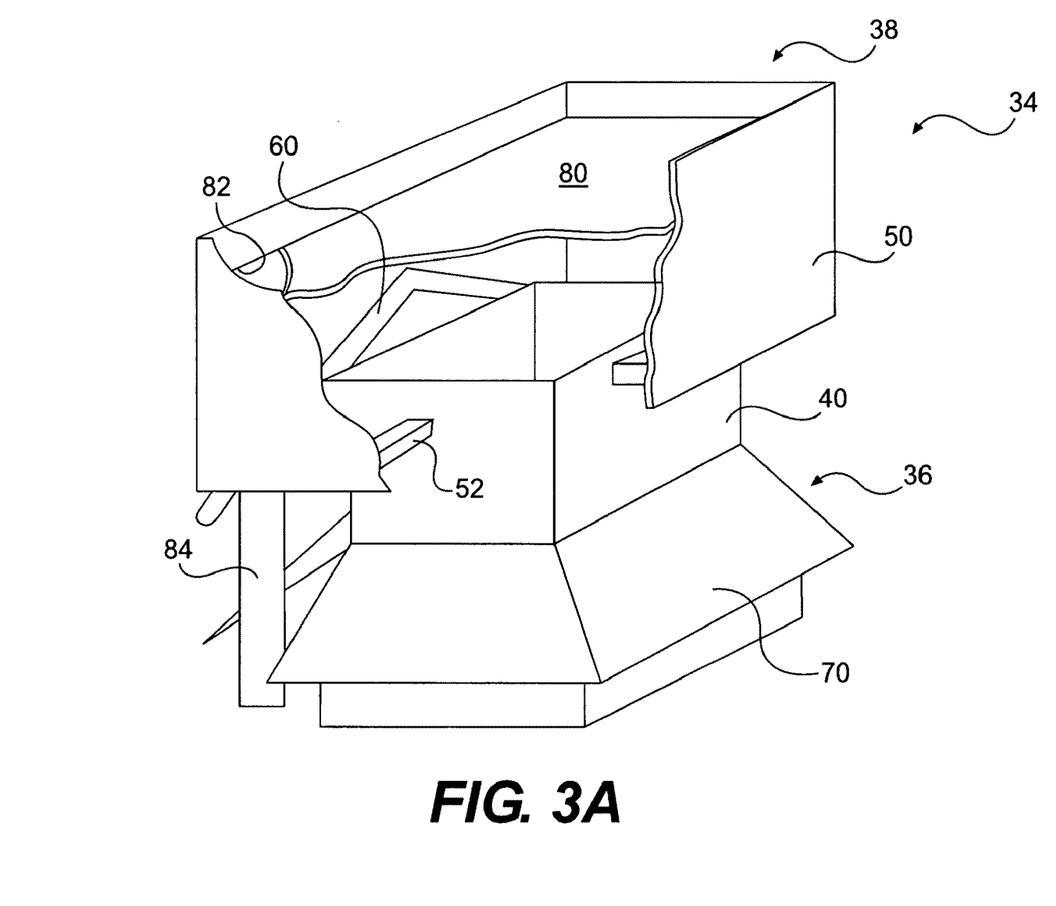
FIG. 3A is a side perspective view partially broken away of the device of FIGS. 1 and 2.

To collect separated liquid and shield it from the vapor stream, the inner surface of the peripheral wall 50 of the hat.38 is provided with a gutter 60. The gutter 60 is formed as a ledge that collects and guides the liquid past the primary force of the vapor stream. The gutter 60 can be formed as a flat member, a grooved member or a member angled toward the peripheral wall 50. Gutters 60 can be provided on all surfaces of the peripheral wall 50, or on selected sides. The gutter 60 may be shaped as an inverted V as shown to direct liquid toward each side of the chimney 34 or may be a single ramp to direct liquid to one side. The angle of the gutter 60 will depend on the particular configuration of the chimney 34. For example, an effective angle is 20-40° from the horizontal. The gutter 60 could even be formed as a groove in the peripheral wall 50. As seen in FIGS. 2 and 3A for example, the gutter 60 preferable extends past the hat 38 and beyond the brunt of the upflowing vapor so that the liquid may freely drop on the tray deck 32 without being re-entrained.

Figure 1:
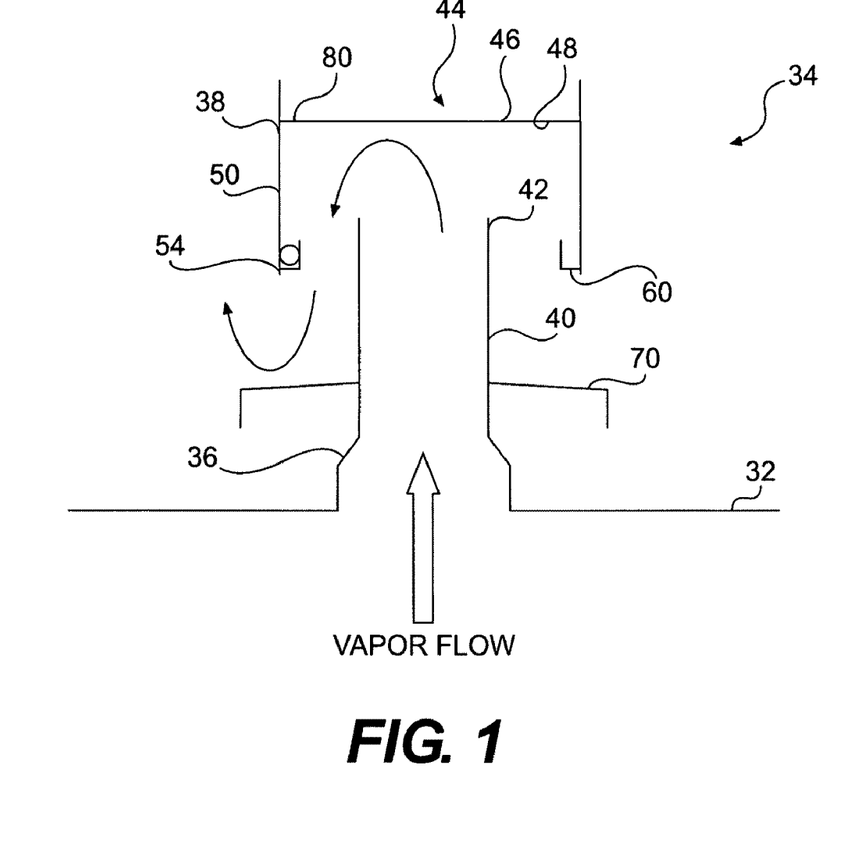
FIG. 1 is a schematic side view of a de-entrainment tray device in accordance with the invention.

Another way to shield the collected liquid from being re-entrained is to provide baffles 70 that extend outwardly from the riser perimeter walls 36. The baffles 70 can extend from every side of the riser 36 or at selected locations. The baffle 70 is generally horizontal or angled downwardly toward the tray deck 32. The baffle 70 is intended to deflect the vapor, as seen in FIG. 1, away from the tray deck 32 and reduce the shear forces on the liquid collected on the tray deck 32. The reduced shear forces will result in less deck liquid re-entrainment.

An additional way to shield the collected liquid from being re-entrained is to provide a channel 80 to collect and direct liquid collected on the top 44 of the hat 38. Liquid can drop from above in the tower 10 back onto the de-entrainment tray 10 and in particular on the top 44 of the hats 38. For example, in vacuum unit flash zones, any resid that escapes the de-entrainment tray 10 will be collected by a packing/grid bed provided in the wash zone 22. The liquid collected in the wash bed drips back down onto the de-entrainment tray 10. In a conventional de-entrainment tray 100, seen in FIG. 8, the liquid dripping on top 116 will drip down the peripheral wall 118 and onto the tray deck 104. As this drip path cuts directly through the vapor flow path, there is a high likelihood of the dripping liquid becoming trapped in the upflow of the vapor.

The channel 80 is formed by upstanding edges of peripheral wall 50 of the hat 38. Preferably, the top 44 is slanted so as to direct liquid to a collection point or points in the channel 80. A drain 82 is provided at the collection point to direct liquid to drain onto the tray deck 32. The drain 82 can be an opening or be formed as a downspout or downcomer 84, which is a channel or merely a guide over which the liquid will flow. The downcomer 84 can extend below the baffle 70, if present, to additionally shield the collected liquid from the upflowing vapor. By this, the liquid that drips from the wash zone 22 is collected and directed onto the tray deck 32 and is effectively isolated from the flow of the vapor up the tower 10.

Figure 3B:
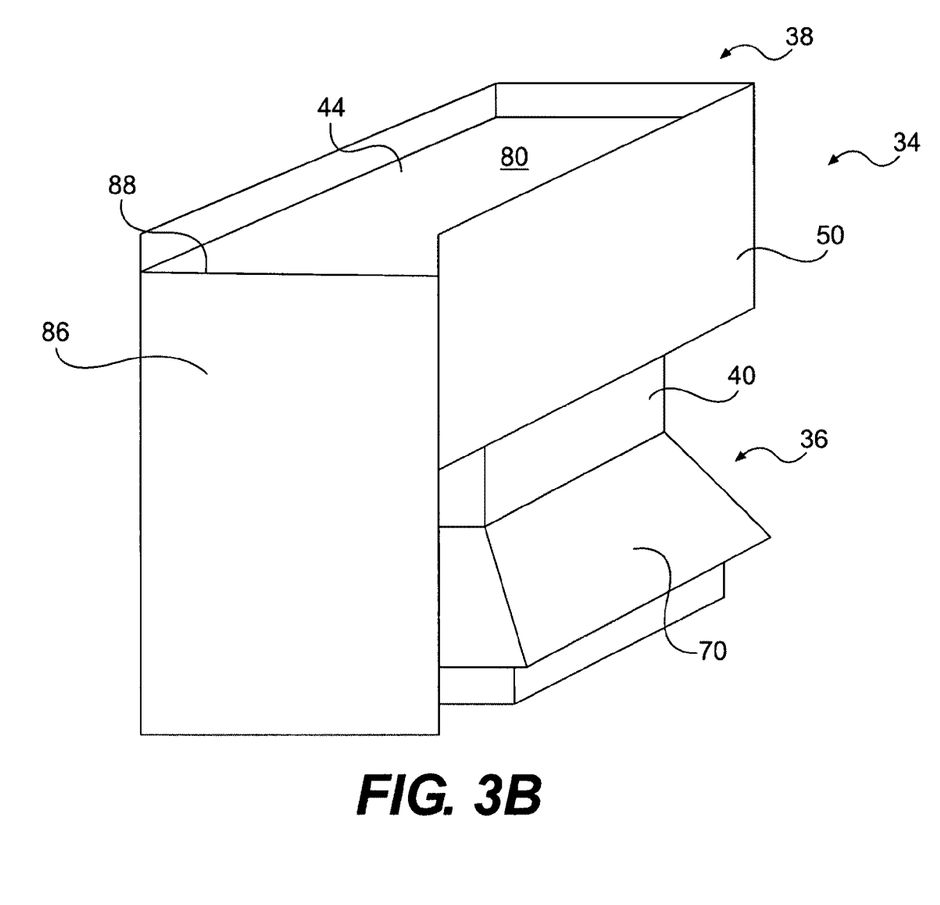
FIG. 3B is a side perspective view of a modification of the device.
Figure 4:
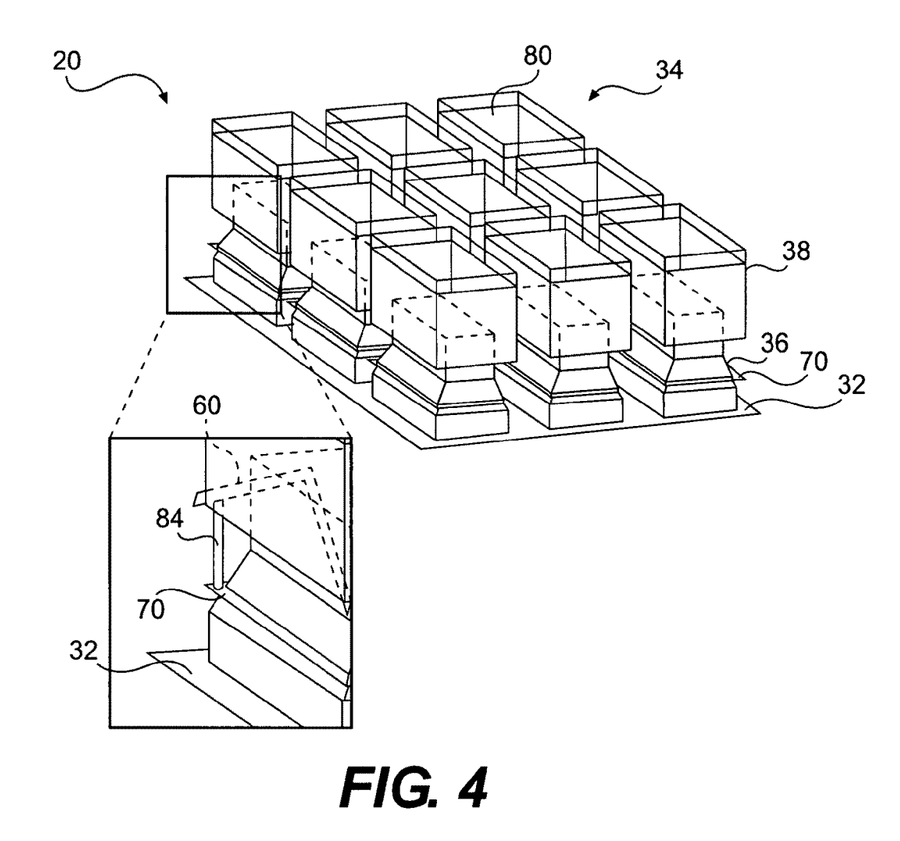
FIG. 4 is a side perspective schematic view of a de-entrainment tray assembly in accordance with the invention.

A modification of the drain configuration is shown in FIG. 3B. In this case, the hat 38 has a channel 80 formed on the top 44 and the drain is configured as a spillway 86 formed as a plate extending downwardly from an edge 88 of the top 44. The spillway 86 directs liquid collected on the top 44 in the channel 80 over the edge 88 toward the tray deck 32. The top 44 can be angled toward the edge 88 to direct liquid to flow toward the spillway 86. An advantage of the spillway 86 is that blockages will not occur as any solids will be carried over the edge 88 to the tray deck 32 and will not clog the drain.

The spillway 86 can be formed at one edge 88 of the top 44, as seen in FIG. 3B, or can be formed on more than one edge, for example on two opposed edges. The spillway could also be formed as part of the riser 36 with one side extending upwardly to the hat 38. Any plate extending from the top 44 toward the tray deck 32 would work as a spillway to direct liquid flow toward the deck 32 while shielding it from the rising vapor to prevent re-entrainment.

Each of these devices collects and protects the liquid separated from the vapor from being re-entrained in the upward vapor flow and results in more effective resid de-entrainment.

Figure 7:
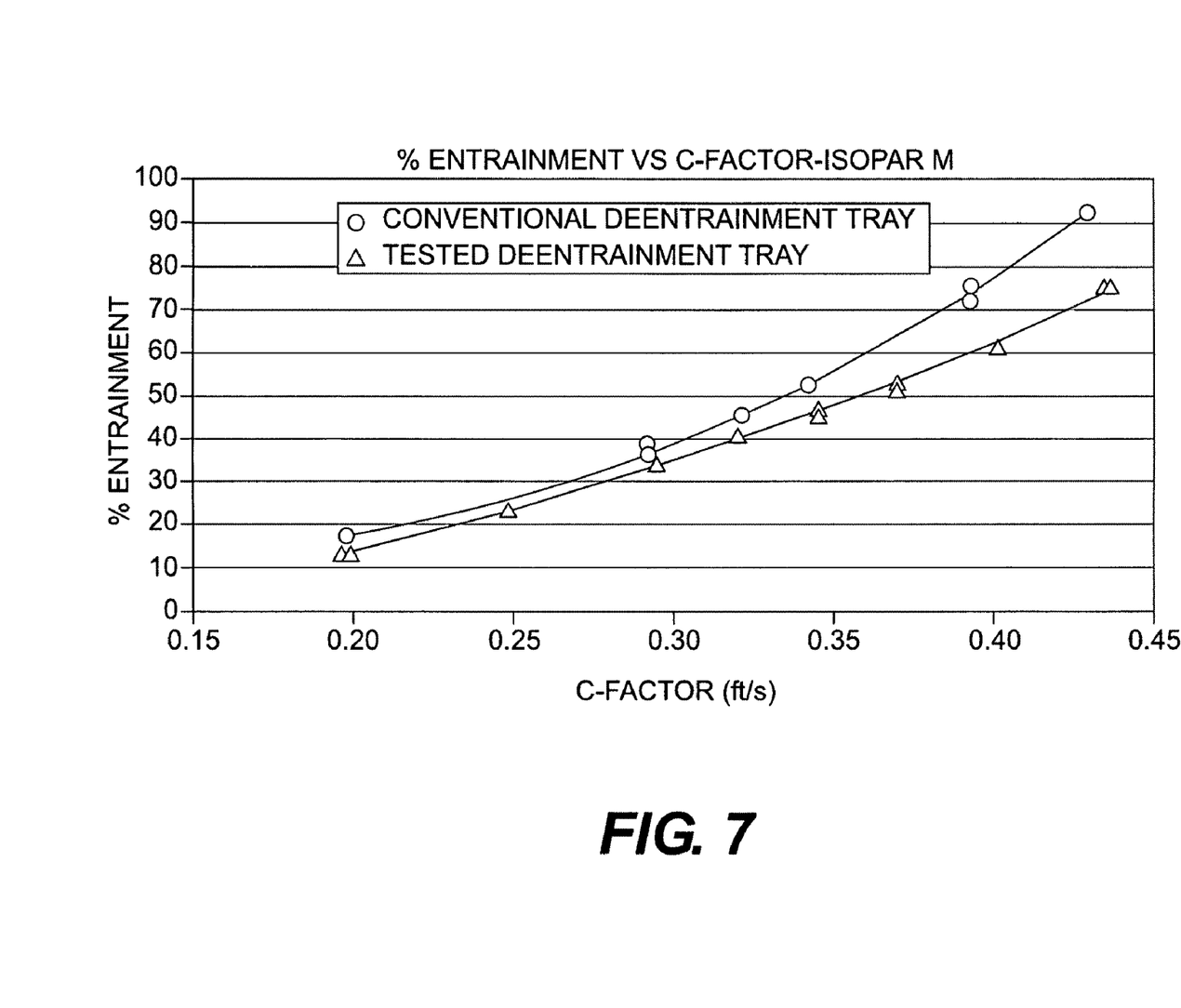
FIG. 7 is a graph showing cold flow testing results comparing a conventional de-entrainment tray and a de-entrainment tray in accordance with the invention; and, FIG. 8 is a schematic side view of a conventional de-entrainment tray device.

The device using gutter 60 was tested in a four foot diameter, 20 foot tall cold flow unit. The results of the testing are illustrated in the graph of FIG. 7, which shows the % of entrainment verses the C-factor-Isopar M. In the test, an atomized inlet spray with a 30 micron Sauter mean diameter drop size was used. This is a severe test due to the small size of the droplets entrained. During testing, only 50% of the gutters were present because the remaining 50% were unable to be installed due to space constraints in the cold flow unit. A 23% reduction in entrainment was shown with the installed gutters. The benefit with gutters on all sides would be expected to be greater.

Figure 5:
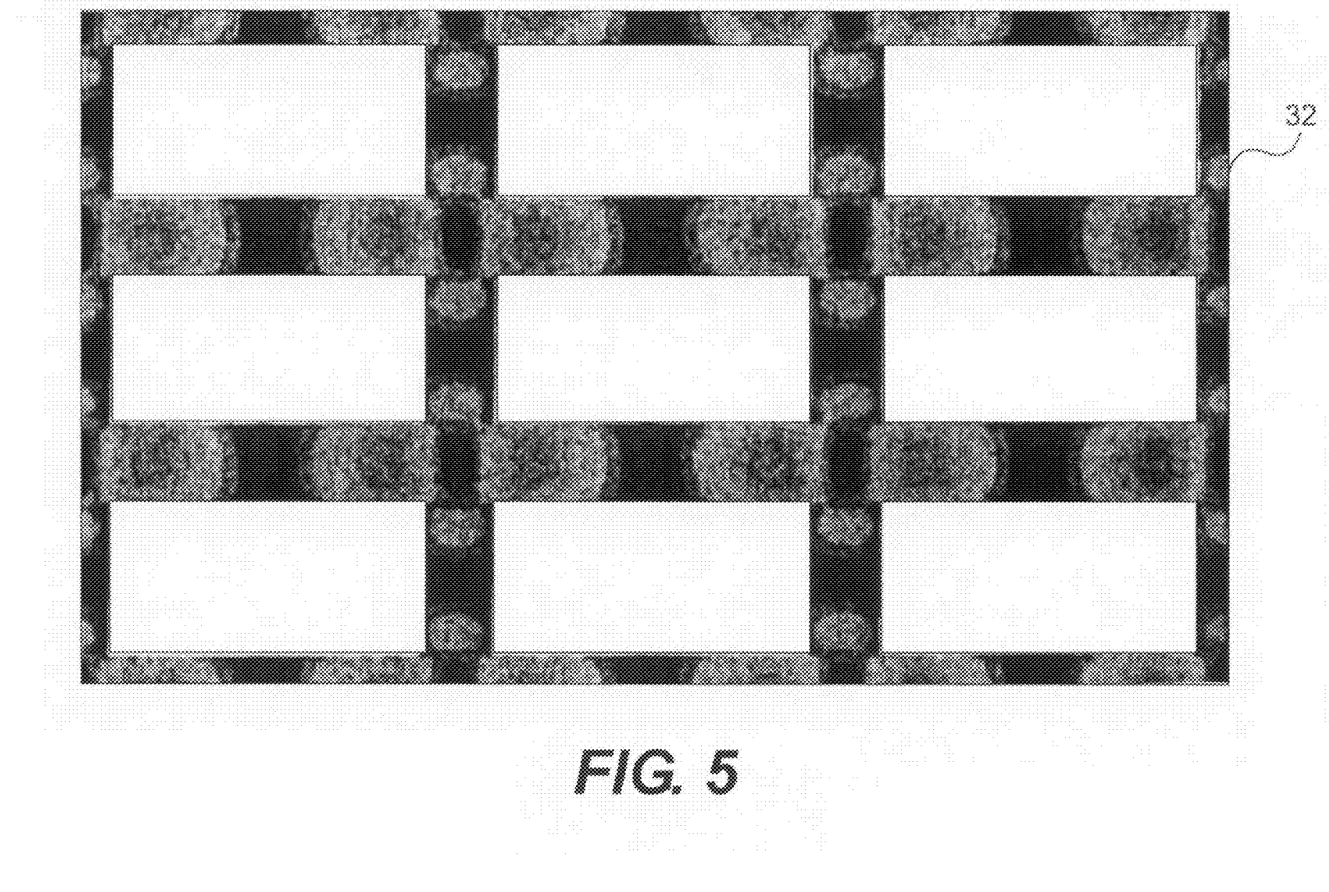
FIG. 5 is a shear force map taken at the tray level of the de-entrainment tray.

The device using the baffles 70 was tested using computational fluid dynamics (CFD) modeling, which is shown in FIG. 5. The CFD modeling shows regions of high shear stresses at the deck level. The regions of highest shear stress occur in the lightest portions near the corners of the chimneys. Addition of the baffles 70 reduced the maximum shear stress to about half the base case levels. The effectiveness of the baffles 70 was also tested in a four foot diameter cold flow unit with air-isopar fluids. In one test, the tray was filled with 2-3 inches of isopar. Air flow was turned on from below at a C-factor of 0.4 fps. The high vapor velocity caused the liquid from the deck to be blown away out the top of the tower. The conventional tray emptied out 2-3 times faster than the tray with baffles. The experiment, coupled with the CFD modeling results, indicates that the deck level shear forces are greatly reduced due to the baffles, which in turn results in significant reduction of deck liquid re-entrainment.

Various modifications can be made in our invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A distillation tower comprising a flash zone and a wash zone with a vapor flow path defined from the flash zone and through a de-entrainment tray upwardly to the wash zone, the de-entrainment tray comprising:
   a tray deck with a plurality of risers extending upwardly from the deck, with each riser having a perimeter wall defining a central hollow passage and an outlet at the upper end of the riser,
   a plurality of hats, with each hat having a top with an upper surface and a lower surface with the lower surface spaced above the riser outlet and a peripheral wall extending downwardly from the top and surrounding and spaced from the perimeter wall of the riser to define an S-shaped vapor flow path extending from below the tray through the passages in the risers and the vapor outlets of the risers and under the under the peripheral walls of the hats, such that liquid is separated from a vapor stream flowing in the vapor flow path, and
   a baffle spaced above the tray deck and extending outwardly from the perimeter wall of each riser to a point beyond the peripheral wall of the associated hat to deflect vapor flow away from the deck and so prevent vapor flow from impinging on the tray deck to re-entrain liquid separated from the vapor stream in the vapor flow path.

2. The distillation tower of claim 1 further comprising a liquid collecting element on each hat comprising a channel formed on the upper surface of the top of the hat with a drain to conduct liquid collected in the channel downward to the tray deck.

3. The distillation tower of claim 2 in which the channel is formed on the upper surface of the top of each hat by the peripheral wall of the hat extending upwardly from the upper surface of the top of the hat.

4. The distillation tower of claim 3, wherein the upper surface of the top of the hat is angled to cause liquid to flow toward the drain.

5. The distillation tower of claim 3, wherein the drain is an opening in the top of the hat.

6. The distillation tower of claim 3, wherein the drain comprises a downcomer extending from the top of the hat toward the tray deck.

7. The distillation tower of claim 3, wherein the drain is a spillway formed as a plate extending downwardly from at least one edge of the top of the hat.

8. The distillation tower of claim 1 further comprising a gutter disposed on an interior side of the peripheral wall of the hat to collect liquid separated from the vapor flow path and accumulated on the peripheral wall.

9. The distillation tower of claim 8, wherein the gutter is angled toward the tray deck.

* * * * *